Dec. 10, 1940.          T. A. BOWERS           2,224,338
                 SHEET METAL PISTON RING
            Filed March 28, 1940      2 Sheets-Sheet 1
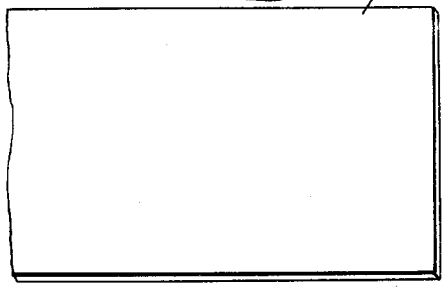
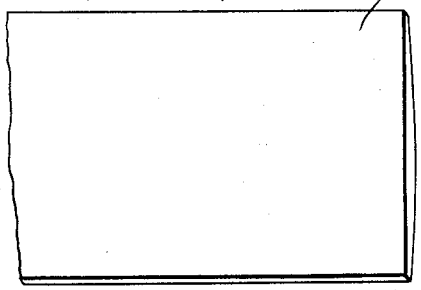
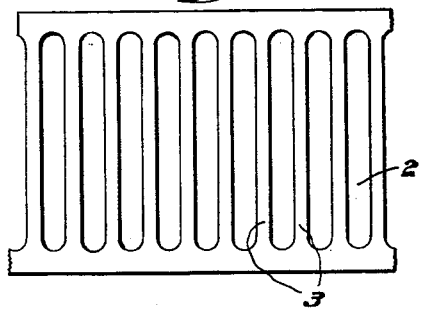
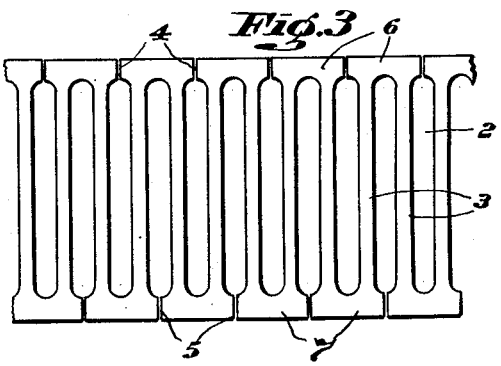
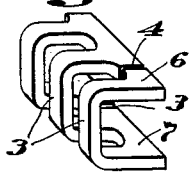
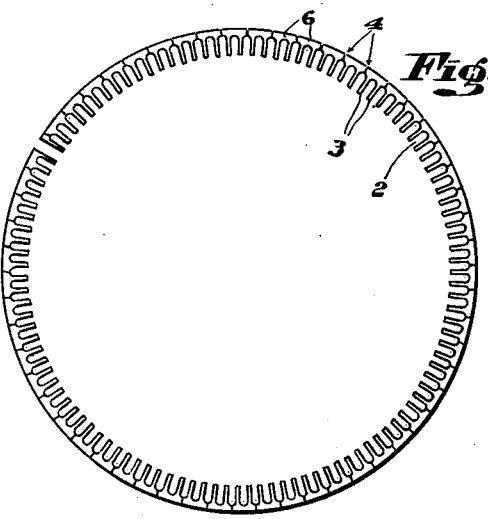
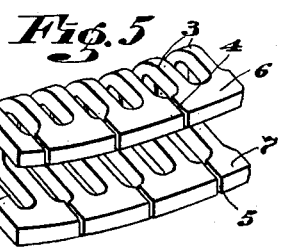
INVENTOR
Thomas A. Bowers
BY
Murna N. Hamilton
ATTORNEY Dec. 10, 1940.  T. A. BOWERS  2,224,338
SHEET METAL PISTON RING
Filed March 28, 1940   2 Sheets-Sheet 2
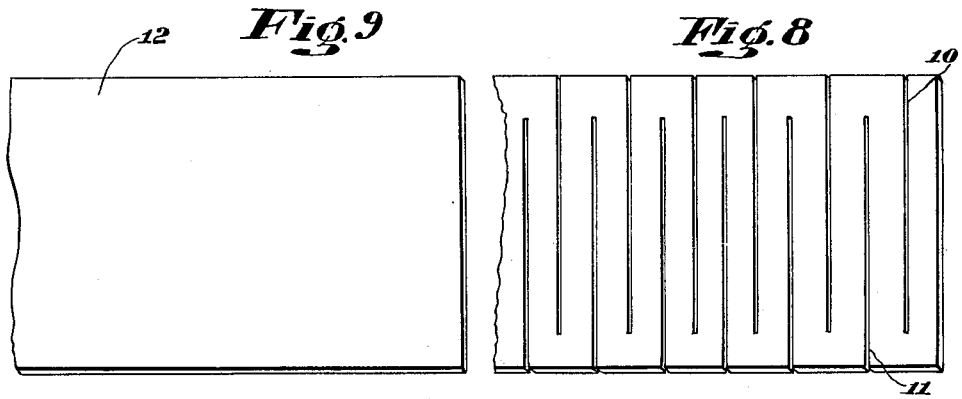
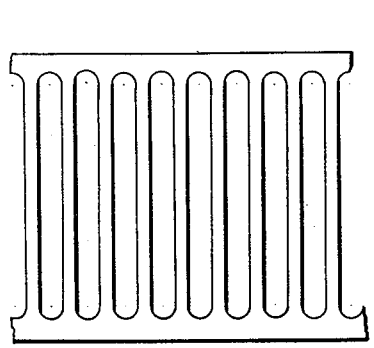
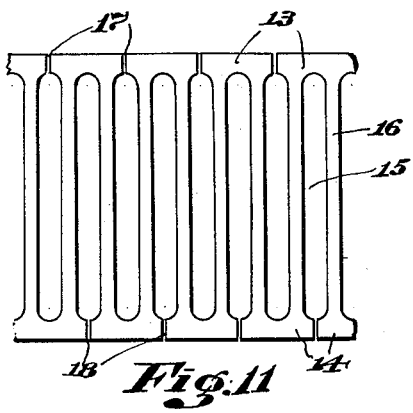
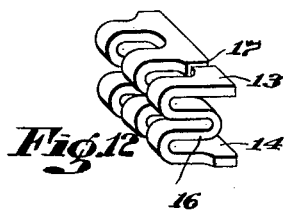
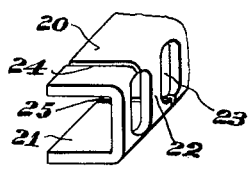
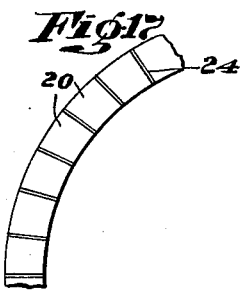
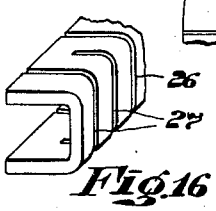
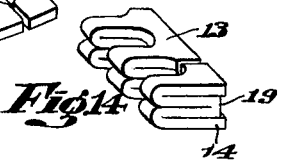
INVENTOR
Thomas A. Bowers
BY
ATTORNEY Patented Dec. 10, 1940

2,224,338

UNITED STATES PATENT OFFICE 2,224,338

SHEET METAL PISTON RING

Thomas A. Bowers, Boston, Mass., assignor to Power Research Corporation, Boston, Mass., a corporation of Massachusetts Application March 28, 1940, Serial No. 326,338

12 Claims. (Cl. 309—45)

This invention relates to piston rings and more especially to rings of the oil control type, and is a continuation in part of co-pending applications, Ser. No. 268,721, filed April 19, 1939, and Ser. No. 276,503, filed May 31, 1939.

In the manufacture of piston rings of the oil control type, it is customary to provide one or more circumferential edges for scraping oil from a cylinder wall. In cast iron rings, this is effected by cutting away their outer peripheries, but the relieved portions eventually become clogged with carbon, and thereafter the rings do not function properly. A further development is the use of steel rings in cylinders and in particular the combination of very thin steel rings with a spacing member and an expander member. These thin rings provide circumferential edges for scraping oil, and while affected by carbon formation to a lesser degree, are inefficient, hard to assemble about a piston, and wear cylinder walls unduly and in the non-uniform manner characteristic of all C-type piston rings.

A principal object of the present invention is to improve piston rings and to devise unitary ring structures having incorporated therein substantially continuous circumferential edges spaced apart to handle oil, and to take the place of and be an improvement upon, separate C-type rings, or other types of oil metering edges. The invention also aims to provide ring structures of novel flexible and extensible character, which are cheap, efficient and durable, and which reduce extrusion of oil from between the ring and its piston groove.

Attainment of these and other objects of the invention will appear in the following description of the drawings and discussion relating thereto.

In the accompanying drawings:

Fig. 1 is a fragmentary perspective view of sheet material employed in making piston rings in accordance with the invention.

Fig. 2 is a fragmentary plan view illustrating a step in the manufacture of a ring of the invention.

Fig. 3 is a fragmentary plan view illustrating a further step in the formation of a piston ring from the sheet material.

Fig. 4 is a fragmentary perspective view of the sheet material illustrating another forming operation in the method referred to.

Fig. 5 is a fragmentary perspective view illustrating still another forming operation resulting in a finished ring.

Fig. 6 is a plan view of the finished ring.

Fig. 7 is a fragmentary view of a modified form of sheet material.

Fig. 8 is a fragmentary perspective view of a sheet material illustrating a modification in the method of forming the sheet.

Figs. 9–13 inclusive illustrate a modification of ring structure and its method of manufacture.

Figs. 14–17 inclusive illustrate further modified sheet metal ring constructions of the type indicated in earlier figures.

Referring in detail to the drawings, there have been illustrated a number of constructions relating to improvements in oil metering piston rings. Of the structures shown, Figs. 1–6 inclusive relate to one general type of ring; and Figs. 7–17 inclusive indicate modifications thereof.

In the construction indicated in Figs. 1–6 inclusive, numeral 1 denotes a strip of sheet material employed in making the rings of the invention. The sheet material is of a resilient nature and may be, for example, a spring steel, alloy or other metal or suitable substance. In accordance with the invention, the strip 1 is formed to provide ring-forming portions disposed in contiguous relation to one another to constitute a novel ring body. As illustrated in Figs. 2 and 3, the strip is punched to provide openings 2 extending transversely within its edges, thereby forming web portions 3. At the edges of the strip are additional cuts or slits 4 and 5 which, along either edge, connect with every other opening 2. It will be noted that the cuts 4 along one edge are staggered with relation to the cuts 5 along the opposite edge, with the result that there are provided segments or crown portions 6 and 7 occurring also in staggered relationship at opposite edges of the strip. The formed material is folded over in a direction longitudinally of the strip to provide a member of U-shaped or other open formation, in which the segments 6 of one edge of the strip are spaced from the segments 7 of the opposite edge, for example as shown in Fig. 4. This provides a straight length of material which is formed into an annular body as illustrated in Figs. 5 and 6. Thereafter a length of the material suitable for effecting a desired piston ring is provided and various finishing operations such as grinding and the like may be resorted to, to provide the completed ring as shown in Fig. 6.

The operations described in connection with treating the sheet material may be effected by apparatus of the type commonly referred to as "tool machinery." For example, the punching of openings 2 may readily be effected with conventional punch press mechanism. Similarly, the cutting of slits or openings 4 and 5 can be effected by conventional cutting or shearing dies, and the folding carried out with press or rolling mechanism. Forming a straight length of folded material into a circular body can be effected in several ways, one example of which is to force a length of the material through an annular channel or die.

In the construction indicated there is provided an annular supporting structure made up of the web portions 3 folded over to form an inner periphery of the ring. In the folded position of the sheet material, the openings 2 extend both radially and vertically of the ring and provide for the folded webs being spaced apart in compressible relation to one another.

Extending radially outward from the supporting structure are the segments 6 and 7, each of which is supported by two webs 3 and disposed in contiguous relation to one another to form upper and lower spaced-apart circumferential edges. The cuts or openings 4 and 5, in the folded position of the strip, extend radially inward and provide for adjacent segments in each of the above mentioned edges also being spaced apart in circumferentially compressible relation to one another.

The openings 4 of the top circumferential edge occur in staggered relation with respect to the openings 5 of the bottom circumferential edge so that contact with that part of a cylinder wall not effected by one circumferential edge will be taken care of by the other edge. Also, the openings 4 and 5 connect with alternate openings 2 to form passages extending radially of the ring.

An important feature of the ring structure described consists in extended oil scraping edges incorporated in a unitary piston ring structure and occurring in spaced-apart relation to form a reservoir between these edges through which oil collected by the edges may be passed to be returned to the crankcase. It has been found that substantially continuous peripheral edges made up of contiguously arranged segments are effective in taking the place of thin edges such as those presented by thin steel C-type rings or other ring structures. Also, when coupled with a circumferentially extensible and contractible supporting structure, such composite or sectional edges are more efficient than the earlier rings noted. Exceptionally good contact of the ring with worn cylinders and highly efficient oil metering are obtained.

Another feature of the ring described consists in novel "land surfaces" or "sealing surfaces," also formed by the segments 6 and 7, which provide for satisfactory seating or sealing of a ring in its groove. It has been found that by arranging the segments in contiguous relation, they may comprise circumferential areas well adapted to constituting seating or sealing surfaces for the ring. It also is found that the size of the segments may be such as to constitute only a part of the radial width of the ring, thus allowing the seating or sealing surfaces to occur at one side of an annular supporting structure. With this reduced sealing surface construction, it becomes possible to form a light, efficient ring which at its supporting portions may be of an open character adapted to facilitating rapid passage of oil therethrough. Also, by introducing construction of satisfactory sealing surfaces from separate ring-forming portions, and satisfactory peripheral oil scraping edges from such ring portions, various composite piston ring constructions and methods of manufacture are possible.

The relatively smaller sealing surfaces of the ring effected by the ring-forming portions or segments also present a further advantage by reason of the fact that there is reduction in the extrusion of oil on to the cylinder wall from the ring slapping in its groove, since less oil can collect at the top and bottom sides of the ring at any one time.

A further feature of the ring structure referred to consists in its novel extensible and contractible character and the manner in which such flexibility is imparted to the ring. This is effected in novel fashion by cuts or openings 2, 4 and 5 arranged in overlapping relation whereby intervening sections or portions of the cut material may be bent or flexed upon one another. By this means there is effected an extensible and compressible element which is adapted to be formed into an annular body and thereafter present circumferential extensibility and contractibility. In developing extensibility in this way in an annular body, a preferred result may be obtained by making those cuts or openings which are to occur at the inner periphery of the body larger than the openings which are to occur at the outer periphery of the body, as for example has been done with respect to openings 2 on the one hand, and 4 and 5 on the other. This improves the range of extensibility which is available from the ring.

In addition to the circumferential extensibility noted, the structure further affords novel axial resiliency of the circumferential edges one to another. This results from the open or U-shaped type of folded construction described and may be utilized to engage a ring in a piston groove for preventing slapping of the ring in its groove and achieving other desirable purposes such as holding the ring in a sealed position at both sides of its groove at all points in the stroke of the piston.

Another improvement of the ring described is the reduction in surfaces upon which carbon can form to materially affect passage of oil through the ring. It is pointed out that in substantially all oil rings special passages are provided to repass oil through a piston into an adjacent crankcase. Such openings of any appreciable size occurring in a ring body tend to become clogged with carbon and fail. Carbonization takes place in two ways: first, in the form of a soft thick body which develops rather quickly; and second, in the form of a hard scaly mass which is formed after longer periods of ring operation. The ring of the invention provides oil passages comprised by the openings 2 which resist formation of either type of carbon. The openings 2 are designed to provide large oil passageways and yet there is relatively little surface of the ring material around the openings upon which carbon can collect or form. It is pointed out that in order for the openings to be closed up, carbon must form on the thin edges of the sheet material and such edges provide very poor supporting surfaces for any appreciable thickness of carbon to become firmly established thereon. Also the flexing of the ring further avoids carbon formation at the edges referred to, as well as in the openings 4 and 5.

In operation the ring functions as a gapless ring with its ends adapted to abut one another. By its circumferential exensibility, the ring completely engages the wall of a cylinder, conforming to any non-uniformity or worn areas in the cylinder, and exerting a substantially uniform pressure at all points therealong. It should be noted that the extensible character of the ring is attained without the use of expander members disposed between the back of the ring and its ring groove. As a result there is less transfer of piston "slap," and a reduction of wear ordinarily devoloping from such piston slap.

With reference to specific operation of the ring structure as an oil metering member, it is pointed out that the segments 6 and 7 are contiguously arranged to constitute interrupted but substantially continuous circumferential surfaces by which the ring may form a satisfactory seal against a top or bottom side of a piston groove for preventing passage of oil thereby. The thickness of the sheet metal may be varied to provide any desired thickness of oil scraping edges. By the location of the relatively large openings 2 extending well out toward the circumferential surfaces made up of the segments 6 and 7, oil collected by these segments may rapidly be passed over the ring into its ring groove and then down into the crankcase.

Various advantages are present in connection with the piston ring construction illustrated in Figs. 1-8 inclusive. There is provided a one-piece ring which is adapted to be conveniently handled and quickly assembled in a piston groove. The ring is provided with a novel extensible and compressible character, rendering it particularly adapted to conforming to worn or irregular cylinder surfaces. There are also provided thin oil scraping edges of a character closely simulating the edges of separate steel C-type rings or other formed oil rings. The entire structure is adapted to be formed of a tough thin material as steel of which only relatively small amounts are required, which results in a light, durable ring. In addition, the use of materials of the character indicated and the composite construction developed in connection therewith are highly adapted to cheap manufacturing processes which can be carried out with conventional forming machinery such as punches, forming and shearing dies, press and rolling mechanism, and the like. Also, relatively small amounts of money are required to be invested in "tooling up" to make the rings, and a relatively small investment is required to be maintained at any one time as compared with corresponding costs in connection with the manufacture of cast iron rings.

The ring is further desirable in respect to furnishing efficient wall pressure. By the construction shown, almost any desired wall pressure may be arrived at without reducing the uniformly extensible character of the ring, and in addition it is possible to provide an improved and increased range of expansibility at any point in which the wall pressure of the ring is satisfactorily operative. The ring is further characterized by efficient oil metering, long operating life, and substantial reduction of cylinder wear.

While the particular forming steps illustrated have been shown in connection with a length or strip of sheet material, it is intended that such operations may be effected upon various other materials occurring on other forms, as in sheet form, or in a web or roll. The material itself may vary in cross section to present relatively thicker mid-portions as illustrated in the material 9 shown in Fig. 7. Such a cross section may be utilized to secure stronger web portions when folded in the manner indicated in Figs. 1-4 inclusive. Other means may be utilized to modify the character of ring structures as for example the use of a plurality of strips or sheets of material. The cutting or forming operations may be varied as for instance in the manner indicated in Fig. 8, in which alternately disposed slits or cuts 10 and 11 of substantially the same width throughout are employed in place of the openings shown in Figs. 2 and 3. Still other changes in the openings or cuts may be resorted to as for example openings may be disposed diagonally or angularly of a strip of the material or in other ways. Also, the cutting or forming operations may be desired to be effected at other stages of the method of making the ring, as after a sheet or strip of piston ring material has been folded or formed into either an intermediate or permanent position, or at some other point. In addition, it may even be desired, in accordance with the invention, to utilize the cutting or forming operations to provide ring-forming portions completely severed from one another and adapted to be separately brought together, piece by piece, on some form of annular supporting structure.

There have been indicated in Figs. 9-17 inclusive a number of ring modifications. With reference to the modification illustrated in Figs. 9-13 inclusive, a strip of resilient material 12 is treated to suitable forming operations such as those illustrated in Figs. 10 and 11 to comprise a blank of the same character as before, having segments or crown portions 13 and 14, openings 15, webs 16, and cuts 17 and 18. Thereafter the step of folding the material to provide spaced-apart circumferential edges extending from a supporting structure, is modified by reversely folding the material longitudinally of itself as has been illustrated in Figs. 12 and 13. The reversely folded webs are arranged in relieved relation with respect to the circumferential edges made up of the segments 13 and 14 so that the same extending relation of these edges is preserved. As before, the folded portions of the webs 16 constitute the inner periphery of the ring and in this instance comprise two rows of spaced-apart folds. The reversely folded construction of the webs 16 increases vertical resiliency of the ring and its ability to engage at opposite sides of a piston ring groove by adding to the available length of the connecting web portions. Other changes occur such as enlargement of oil passage area, increase in the height of the ring, and others, all of which are intended to further illustrate the versatility of formed sheet metal piston ring construction.

In Fig. 14 is illustrated a modification of ring obtained from compacting segments 13 and 14 of the ring just above described into a substantially solid body. If desired, those points of folding occurring along the outer periphery of the ring may be formed to present square sides 19 as illustrated. A ring of heavier, more solid construction is attained by this compacted construction.

Figs. 15-17 inclusive relate to a ring modification having top and bottom circumferential edges made up of segments 20 and 21, webs 22, and openings 23, in which the openings 23 extend throughout only that portion of the ring which may be considered to constitute its inner periphery. The result is to provide substantially continuous top and bottom sides for the ring made up of the crowns or segments. A further modification of openings is illustrated in Fig. 16 in which only thin slots, as 26 and 27, occur at any point in the ring. Such an effect is readily arrived at by cutting a strip of sheet metal in the manner previously referred to and illustrated in Fig. 8 of the drawings.

It will be observed that there have been disclosed and described ring members broadly illustrative of composite structures made up of separate ring-forming portions particularly adapted to constitute circumferential oil scraping edges embodied in a unitary oil control ring. It is pointed out that a novel combination of cutting and folding operations has been devised, to produce novel ring constructions, ring surfaces, and ring functioning, and that each of the several forming and assembling procedures are subject to modification in various directions, and for various purposes, and are applicable in connection with making any type of piston ring. Attention is directed to the fact that there are presented novel, cheap, light, efficient, and durable ring structures, constituting a radical departure from the art as now developed, and it should be noted that there is made available a piston ring construction highly adapted to being manufactured from tool machinery at greatly reduced cost, tending to lower the cost of manufacture of piston rings generally. Advantageous oil conducting, extensibility, durability, and ease of assembly have been embodied in a unitary construction and undesirable factors have been reduced to a minimum.

While I have shown preferred embodiments of the invention, it should be understood that various changes and modifications may be resorted to in connection therewith, in keeping with the spirit of the invention as defined by the appended claims.

Having described my invention, I claim:

1. A piston ring comprising a strip of resilient sheet material reversely folded longitudinally of itself thereby forming upper and lower sides of the ring which are separated and supported by a resilient web structure, said web structure comprising a reversely folded central portion of said resilient strip, said sides comprising segments separated by openings extending from the sides in overlapping relation.

2. A piston ring comprising a strip of resilient sheet material formed into an annular body, said material folded longitudinally of the strip to provide circumferential land surfaces and connecting web portions, said annular body having openings extending between the said circumferential surfaces and web portions, said openings defining circumferential segments in the land surfaces and being of relatively greater size at the said web portions.

3. A piston ring comprising a strip of resilient sheet material formed into an annular body, said material folded longitudinally of the strip to provide radially extending circumferential edges, said annular body having slits extending from the said edges respectively in overlapping relation to provide circumferential extensibility and compressibility in the said ring.

4. A piston ring comprising a folded strip of piston ring material, opposite edges of said strip occurring at the outer periphery of the said ring, said strip having alternately disposed overlapping openings extending transversely inward from each of its edges for the purpose of imparting circumferential and radial flexibility to the said ring.

5. A circumferentially and radially flexible piston ring comprising upper and lower layers formed of a strip of sheet material, the edges of the said strip occurring in spaced-apart relation at the outer periphery of the said ring, each of said upper and lower layers being separated by openings extending from the sides of the strip in overlapping relation, and said openings forming segments circumferentially movable with respect to one another and said openings of one of the layers being arranged in staggered relation with respect to the openings of the other layer.

6. A circumferentially and radially flexible piston ring comprising a strip of piston ring material presenting upper and lower layers, connecting portions for the said upper and lower layers, both of the edges of said strip of material occurring at the outer periphery of the said ring, each of said layers being separated into contiguous segments by openings which extend from the sides of the strip in overlapping relation, and each of said segments including parts of two of the said connecting portions.

7. A circumferentially and radially flexible piston ring comprising a strip of piston ring material presenting spaced-apart layers in the said ring, both of the edges of said strip of material occurring at the outer periphery of the said ring, and separated connecting portions for the said spaced-apart layers, each of said layers having radially extending openings defining crown portions, said openings of one layer occurring in staggered relation to the openings of the other layer, and each of said crown portions having integral therewith two of the said connecting portions.

8. A circumferentially and radially flexible piston ring comprising spaced-apart layers of sheet material, providing land surfaces at the outer periphery thereof, connecting portions for the said layers, said connecting portions extending radially inward of the ring beyond the said layers, said layers having overlapping radial slots defining circumferentially movable segments in the land surfaces of the ring.

9. A flexible piston ring comprising a strip of sheet material, said strip having openings extending transversely inward from each of its edges in overlapping relation with respect to one another, said strip being bent transversely with respect to the said openings and having its edges occurring in spaced apart relation at the outer periphery of the ring.

10. A flexible piston ring comprising a strip of sheet material having openings transversely formed therealong in overlapping relation, said strip being bent longitudinally of itself and having its edges occurring at the outer periphery of the ring in spaced-apart relation, the openings of one edge being staggered with respect to the openings of the other edge.

11. A flexible piston ring comprising a strip of sheet material, said strip having both of its edges occurring in spaced-apart relation at the outer periphery of the ring, said strip having slots extending past one another from the edges thereof, thereby forming crown portions and web portions connecting said crown portions, each of said crown portions having at least two of the said web portions integral therewith, and said web portions constituting the inner periphery of the said ring.

12. A circumferentially and radially flexible metal piston ring comprising upper and lower layers, reversely folded connecting portions for said layers, said reversely folded connecting portions extending radially inward of the ring beyond the said layers and said ring having slots extending radially from said layers into overlapping relation, and defining circumferentially movable segments.

THOMAS A. BOWERS.